United States Patent [19]

LeGrand

[11] 4,410,367

[45] Oct. 18, 1983

[54] METHOD FOR TREATING AGGREGATE AND PRODUCTS OBTAINED THEREFROM

[75] Inventor: Donald G. LeGrand, Burnt Hills, N.Y.

[73] Assignee: General Electric Co., Schenectady, N.Y.

[21] Appl. No.: 386,854

[22] Filed: Jun. 10, 1982

[51] Int. Cl.³ .............................................. C04B 31/44
[52] U.S. Cl. ........................... 106/308 N; 106/281 N; 428/404
[58] Field of Search ....................... 106/308 N, 281 N; 428/404

[56] References Cited

PUBLICATIONS

Redicote ® Reference Manual, Armak, Highway Chemicals Department.

*Primary Examiner*—James Poer
*Attorney, Agent, or Firm*—William A. Teoli; James C. Davis, Jr.; James Magee, Jr.

[57] ABSTRACT

A method is provided for treating aggregate useful in the production of asphalt concrete. The aggregate is treated with an aqueous solution of a mixture of a polyelectrolyte and a surfactant. The resulting treated aggregate has substantially the same resistance to weatherability as shown by aggregate treated with polyelectrolyte free of surfactant. In addition, aggregate treated with the surfactant-polyelectrolyte mixture and thereafter coated with asphalt exhibits a superior ability to resist asphalt stripping, as compared to aggregate treated with polyelectrolyte free of surfactant.

12 Claims, No Drawings

METHOD FOR TREATING AGGREGATE AND PRODUCTS OBTAINED THEREFROM

CROSS REFERENCE TO RELATED APPLICATIONS

Reference is made to my copending application Ser. No. 252,253, filed Apr. 9, 1981, for Method of Upgrading Rock and Treated Rock Obtained Therefrom, now U.S. Pat. No. 4,341,824, which is a continuation-in-part of copending application Ser. No. 062,914, filed Aug. 2, 1979, now abandoned, for Method of Upgrading Rock and Treated Rock Obtained Therefrom, where both applications are assigned to the same assignee as the present invention.

BACKGROUND OF THE INVENTION

Prior to the present invention, various methods are evaluated for treating rock to render the rock more resistant to environmental degradation. There have been many studies and methods of improving the quality of building stone and monuments, and limited study has been devoted to coarse aggregate quality improvement.

One study directed to aggregate improvement is shown by the interim report of May 1977, revised and updated January 1978, report PTI 7707 of the Pennsylvania Transportation Institute of Pennsylvania State University of P. V. Cady, "Upgrading of Poor or Marginal Aggregates for PCC and Bituminous Pavements". Various organic materials were evaluated as treating agents for improving the resistance of aggregate to degradation. Although valuable information has been generated from the aforementioned study, various solutions to the problem of aggregate degradation resulting from exposure to adverse environmental conditions including air pollution, moisture, or inorganic salt contact are constantly being evaluated. Improvement has been noted by using organic materials, such as epoxy resins, methyl methacrylate, etc., to treat marginal aggregate, but the degree of aggregate upgrading achieved has not warranted the cost of using such material unless the organics were extensively diluted in polluting organic solvents.

Standard engineering tests can be performed to predict the quality of aggregate. One procedure, for example, has been the magnesium or sodium sulfate soundness test, ASTM C88-76. In many instances, local high quality curse aggregate is not available for building construction and must be obtained at a high transportation cost. Various procedures have been used in an attempt to improve the quality of marginal or submarginal rock, for example, argillaceous limestone, highly crystalline limestone and graywacke sandstone to upgrade such material for use in portland cement, or bituminous or asphalt concrete. Procedures of the prior art have been found to be unacceptable because of economic or environmental reasons, or the treated rock failed to survive the magnesium or sodium sulfate soundness test.

Improved results have been achieved as shown by U.S. Pat. No. 4,256,501 of George M. Banino, based on the use of an organic solvent mixture of an organic condensation polymer and an aliphatic polyamine. However, organic solvent can present environmental pollution problems. In addition, the aforementioned aryl condensation polymer, for example, silicone-polycarbonate block polymers can significantly increase the cost of such treatment due to the expense of the starting reactants.

In my copending application Ser. No. 252,253, filed Apr. 9, 1981, there is taught that certain polyelectrolytes, that is polymeric substances in which the monomeric units of its constituent macromolecules possess ionizable groups, for example, polyethylenepolyamine, can be employed in the form of an aqueous solution to treat rock, stone or aggregate in the substantial absence of any unhardened cement, or material with adhesive and cohesive properties which make it capable of binding material fragments into a compact whole. It was found that the degradation of the treated rock was dramatically improved if the rock or aggregate was treated with the aqueous solution of polyelectrolyte and thereafter allowed to dry. The aggregate treated in accordance with Ser. No. 252,253 also was found to improve the compressive strength of portland cement compositions resulting from the cure of mixtures of portland cement concrete mixtures containing such treated aggregate. However, asphalt applied onto the surface of such aggregate treated in accordance with Ser. No. 252,253 was found to have a tendency to readily strip from the treated aggregate surface. For example, such asphalt coated aggregate failed the boiling water test used by the State of New York Department of Transportation to evaluate the soundness of coated materials employed in the construction of bridge decks and highways. The New York boiling water test is as follows:

Into a 200 cc container is placed 100 grams of aggregate as defined hereinafter. The container is then heated until the aggregate reaches a steady state temperature of about 150° C. (300° F.). There is then poured onto the heated aggregate 5-6 grams of AC10 or AC20 commercially available liquid asphalt preheated to a temperature of 150° C. The resulting mixture is then stirred for 3-5 minutes and the blend is thereafter allowed to cool to room temperature.

About 175 ml of water is then poured into the container onto the asphalt coated aggregate until it is covered. The water is then heated to boiling. After 1 minute of a rolling boil, the aggregate is removed, drained and immediately doused with cold water. After the aggregate cools, it is drained and examined for bare spots. If the aggregate surface shows more than about 10% stripping, it is considered a failure. The percent stripping is based on a visual estimate of the approximate number of aggregate partially or completely free of asphalt, divided by the total number of asphalt coated aggregate initially used.

The present invention is based on the discovery that improved resistance to the stripping of asphalt can be achieved from the surface of aggregate treated with polyelectrolyte to improve its weatherability, in accordance with the method of Ser. No. 252,253 if a surfactant, as defined hereinafter, is utilized in combination with the polyelectrolyte initially used to treat the aggregate.

STATEMENT OF THE INVENTION

There is provided by the present invention, a method for enhancing the resistance of aggregate to the effects of atmospheric degradation and improve its ability to resist separation from cured asphalt concrete when incorporated into asphalt cement prior to cure to reinforce the resulting asphalt concrete mixture which comprises, (1) treating the aggregate with an aqueous polyelectrolyte-surfactant mixture having at least 1% by weight of polyelectrolyte with a molecular weight of up to about 1000 and 0.001% to 1% by weight of surfactant, based on the weight of the aqueous polyelectrolyte-surfactant mixture, where the surfactant is selected from the class consisting of a cationic surfactant, an anionic surfactant, a nonionic surfactant, and an amphoteric surfactant, (2) and thereafter allowing the treated aggregate to dry by heating or exposure to ambient conditions.

Included by the term "polyelectrolyte" as used in the practice of the present invention, is any water soluble ionic polymer in the form of either polyacid, polybase, or polyampholite, depending upon the nature of its ionization in water solution. A more comprehensive definition of the term polyelectrolyte can be found in the Encyclopedia of Polymer Science and Technology, Vol. 10, pp. 781–861 (1969) John Wiley & Sons, New York. The preferred polyelectrolytes are polyethyleneimine or polyalkylene polyamine, manufactured by the Dow Chemical Company, Midland, Mich., having a molecular weight in the range of from about 200 to about 1000. Some of these preferred polyelectrolytes are anhydrous polyalkylene polyamine polymers (E-100) of the Dow Chemical Company, having the following characteristics:

| Property | E-100 |
|---|---|
| Formula | $H_2N(C_2H_4NH)_nH$ |
| Molecular weight | Approx. 250-300 |
| Boiling Range, °C. | >250° C. at 760 mm. Hg |
| Freezing Point, °C. | Below 40[1] |
| Specific Gravity, 25/25° C. | 1.02 |
| Pounds per Gallon, 25° C. | 8.46 |
| Flash Point, °F. | 425 Cleveland open Cup |
| Approximate Solubility grams per 100 grams solvent at 25° C. | |
| Acetone | |
| Benzene | |
| Carbon Tetrachloride | Reacts Violently |
| EthylEther | |
| n-Heptane | <0.1 |
| Methanol | |
| Water | |

[1]Pour Point

Some of the following Quaternized polyalkylene polyamines XD-30267, XD-30268, XD-30269 and XD-30269.01 are also included.

| Property | XD-30267 | XD-30268 | XD-30269 | XD-30269.01 |
|---|---|---|---|---|
| % of Quaternization | 10 | 25 | 50 | 75 |
| Mol. Wt. | 40–80,000 | 40–80,000 | 40–80,000 | 40–80,000 |
| pH, $25 deg C$ | 9 | 8 | 8 | 8 |
| % Solids, Active | 35 | 35 | 35 | 35 |
| % Solids, Non-volatile | 50.4 | 50.3 | 51.2 | 49.6 |
| Viscosity, cps, Brookfield RTV #3 Spindle at 100 RPM #3 Spindle at 50 RPM | 1502 | 478 | 167 | 55 |
| Specific Gravity, $25/25 deg C$ | 1.152 | 1.161 | 1.163 | 1.164 |
| Pounds per gallon, $25 deg C$ | 9.6 | 9.67 | 9.7 | 9.7 |

The term "aggregate" as employed in the description of the method of the present invention is intended to include stone, rock, block, concrete, having a diameter of at least ¼". More particularly, aggregate means rock containing 50% or more of siliceous minerals and those rocks containing 50% or more of carbonate minerals. Silicious rock is represented, for example, by dark gray, fine-grained graywacke sandstone with interbedded black shale layers and beds. Carbonate rock is represented, for example, by medium crystalline metamorphic dolomitic marble; medium to dark gray, fine grained dolomite to argillaceous dolomite with interbedded black shale partings; and an inter-reef deposit of nearby black, fine grained, argillaceous dolomite to shalely dolomite. In addition to these aggregate rock, those skilled in the art also would know that surface treatment of existing stone structures, for example, monuments, road surfaces, bridges, buildings, etc., having existing shaped stone surfaces also can be benefited and are included with the scope of the present invention.

The term "surfactant" as used in the practice of the present invention includes anionic surfactant, nonionic surfactant, cationic surfactant and amphoteric surfactant. A more complete definition of the term surfactant can be found in Kirk-Othmer Encyclopedia of Chemical Technology (2nd Edition), Vol. 19, 1969, page 507–593.

The following materials illustrate some of the anionic, nonionic, cationic and amphoteric surfactants which are commercially available:

| | Anionic | |
|---|---|---|
| Surfactant | Typical Composition | Manufacturer and Address |
| Hamposyl | Cocyl Sarcosin | W.R. Grace & Co., Nashua, NH |
| Gafac | free acid of a complex organic phosphate ester | GAF Corp., New York, NY |
| Duponol | Amine long-chain alcohol sulfate | E.I. Du Pont Co., Wilmington, Del. |
| Zelec | Alcohol phosphate composition | E.I. Du Pont Co. |
| Avitone-F | Formulated sodium hydrocarbon sulfonate | E.I. Du Pont Co. |
| Alkanol | Sodium alkyl naphthalene sulfonate | Alkaril Chemicals, Winder, GA |
| Colloid | — | Colloid Inc. Newark, NJ |
| Sarkosyl | Oleyl sarcosine | Ciba-Geigy Corp., Greensboro, NC |
| Aerosol | Dioctyl ester of sodium sulfosuccinic acid | American Cyanamid, Pearl River, NY |
| Klearfac | free acid of an organic phosphate ester | BASF Wyandotte Corp., Charlotte, NC |
| Dowfax | Sodium dodecyl diphenyloxide disulfonate | Dow Chemical Company, Midland MI |
| Witconite | — | Witco Chemical Co. New York City, NY |
| Tamol | Sodium salt of polymeric carboxylic acid | Rohm & Haas Co., Philadelphia, PA |
| Emphos | phosphate ester | Witco Chemical |

-continued

Anionic

| Surfactant | Typical Composition | Manufacturer and Address |
|---|---|---|
| Triton | Alkylaryl polyether alcohol plus a non-ionic solubilizer | Corp., Rohm & Haas Co. |
| Ninate | Calcium alkylaryl sulfonate | Stepan Chemical Co., Northfield, IL |
| Richonic Acid | Alkylbenzene sulfonic acid | The Richardson Co., Des Plaines, IL |
| Richonate | Amine salt | The Richardson Co. |
| Fluorad | Fluorochemical surfactant | 3M Company, St. Paul, MN |
| Atlas | Alkyl aryl sulfonate | ICI Americas, Inc., Wilmington, Del. |
| Kelco | — | Kelco, San Diego, CA |

Nonionic

| Surfactant | Typical Composition | Manufacturer and Address |
|---|---|---|
| Pluronic | A series of condensates of ethylene oxide with hydrophobic bases formed by condensing propylene oxide with propylene glycols. | BASF Wyandotte Corp., |
| Tetronic | A series of compounds formed by the addition of propylene oxide to ethylene diamine followed by the addition of ethylene oxide. | BASF Wyandotte Corp. |
| Plurafac | modified oxyethylated straight chain alcohol | BASF Wyandotte Corp. |
| Varonic | ethoxylated coco amine | Sherex Chemical Co., Dublin, OH |
| Span | Sorbitan trioleate | ICI Americas, Inc. |
| Merpol | Ethylene oxide | E.I. Du Pont Co. |
| Zonyl | Fluorochemical surfactant | E.I. Du Pont Co. |
| Antarox | Aliphatic polyester | GAF Corp. |
| Igepal | Nonylphenoxy poly(ethyleneoxy) ethanol | GAF Corp. |
| Brij | Polyoxyethylene lauryl ether | ICI Americas, Inc. |
| Renex | Polyoxyethylene ether alcohol | ICI Americas, Inc. |
| Tween | polyoxyethylene sorbitan monooleate | ICI Americas, Inc. |
| Atmos | mono and diglycerides | ICI Americas, Inc. |
| Sterox ND | alkylphenols, ethoxylated | Monsanto Company, St. Louis, MO |
| Poly-Tergent | Nonylphenoxy polyethoxyethanol | Olin Corp., Stamford, Conn. |
| Makon | Alkylphenoxy polyoxyethylene ethanols | Stepan Chemical Co. |
| Flo-Mo | — | DeSoto, Inc. Sellers Chemical Div., Harahan, LA |
| Pomulgen | — | Robinson, Wagner Co., Inc. Mamaroneck, NY |
| Triton | Octylphenoxy polyethoxy ethanol | Rohm & Haas Co. |
| Fluorad | Fluorochemical surfactant | 3M Company |
| Witcamide | Alkanolamide | Witco Chemical Corp, Southland Corp., Chem. Div., Argo, IL |
| Actramide | Alkylolamide | |
| Tergitol | Polyethylene glycol ether of primary alcohol | Union Carbide, Corp., Danbury, CT |
| Monamine | Tall oil alkanolamide | Mona Industries, Inc. Paterson, NJ |

Cationic

| Surfactant | Typical Composition | Manufacturer and Address |
|---|---|---|
| Kemamine | Distilled dimethyl hyd. tallow tertiary amine | Humko Chemical Div., Witco Chem. Corp. Memphis, TN |
| Alkaterge | a substituted oxazoline | International Minerals & Chemical Corp. Des Plaines, IL |
| Adogen | Dimethyl dihydrogented tallow ammonium chloride | Sherex Chemical Co. |
| Amine | Heterocyclic tertiary amine | Ciba-Geigy Corp. |
| Variquat | — | Sherex Chemical Co. |
| Emcol | Polypropoxy quaternary ammonium chloride compound | Witco Chemical Corp. |
| Duomeen | N—coco trimethylene diamine | Armak Inc. Chicago, IL |
| Armeen | Primary alkylamines | Armak Inc. |
| Dodecyltrimethyl-ammonium chloride | — | Eastman Kodak Co. Rochester, NY |
| Amine-O | Heterocyclic tertiary amine | Ciba-Geigy Corp. |
| Dodecyl-amine (laurylamine, D22,220-8) | — | Eastman Kodak |

The term "asphalt" or "asphalt cement" as used in the description of the present invention is a dark-brown to black cementitious material, solid, semisolid, or liquid in consistency in which the predomenant constituents are naturally occurring bitumens or which are obtained as residue in petroleum refining. Asphalt is further defined by Kirk-Othmer, Encyclopedia of Chemical Technology, Vol. 3, Third Edition (1978), p. 284–327, John Wiley & Sons, New York.

The test method used to evaluate rock treated in accordance with the practice of the present invention is the sulfate soundness test. More specifically, the rock was tested in accordance with New York State Department of Transportation "Soundness of Course Aggregates by Magnesium Sulfate Solutions", test method New York 207 B-76. This test is based on the ASTM soundness of aggregates by use of sodium sulfate or magnesium sulfate test method C88-76. The New York State test method maintains a solution temperature of 74° plus or minus 1° F. Another significant distinction between the two test methods is that the New York State test method is based on a 10 cycle test while the ASTM test is run on a 5 cycle test.

The term aggregate as utilized in the practice of the present invention includes crushed stone and gravel and can vary in size from approximately $\frac{1}{4}''$ to 4'' in diameter. Preferably, the average diameter of the aggregate is $\frac{1}{4}''$ to $1\frac{1}{2}''$. It is preferred to utilize aggregate in the practice of the present invention in the substantial absence of unhardened cement, or any material falling outside of the aforedescribed aggregate definition which would interfere or compete with the surface treatment of the aggregate by the polyelectrolyte.

Aggregate utilized in the test method for evaluation is initially screened to separate out the fraction passing a ½ inch screen and retained on a ¼ inch screen. The sized aggregate is then washed to remove any dust or coatings. The washed aggregate is then dried in an oven to constant weight at a temperature of 230° F. plus or minus 90° F. The dried sample is then weighed to obtain a 2500 gram plus or minus 50 gram charge.

The dried aggregate is then placed into a wire mesh basket and immersed into the treating solution for about 30 seconds to 1 minute and agitated slightly to displace any air pockets. The basket is then removed from the solution of the composition and allowed to set for several minutes until little or no solution runoff is observed. The treated sample is then dried in an oven at a temperature of 230° F. plus or minus 9° F. to a constant weight.

The treated sample is then tested for its ability to resist environmental degradation by immersing it while in a wire basket into a magnesium sulfate solution for 16–18 hours. After immersion, the sample is removed and allowed to drain for about 15 minutes and then placed into a drying oven which is at a temperature of 230° F. plus or minus 9° F. The sample is then dried to 6½ hours, completing one cycle. The process of alternate immersion of drying was repeated for 10 full cycles.

After completing the final cycle, the sample is washed free of any magnesium sulfate and then dried to a constant weight of a drying oven at a temperature of 290° F. plus or minus 9° F. The dried aggregate is then resieved over ¼ inch sieve and the weight recorded. The difference between the final weight and the original weight represents the loss due to "D" or "degradation". The %D is expressed as a percentage of the original weight.

In instances where blocks of stone are tested, a modification of the above-described aggregate test procedure is employed. Approximately cubical shaped blocks ranging from about 1½ inch to 3 inches on a side are separated from larger blocks either by sawing or by breaking the stone with a hammer and chisel. The blocks are then either soaked in the test solution for up to one minute, or coated with the solution using a paint brush. The blocks are then placed in an oven at a temperature of 230° F. plus or minus 9° F. to constant weight. The temperature of 230° F. plus or minus 9° F. to constant weight. The prepared samples are then subjected to alternate immersion and drying for 10 cycles in the same manner as described above for the aggregate. Upon completion of the final cycle, the blocks are then washed free of magnesium sulfate and the %D is observed quantitatively in terms of percent weight loss based on the original weight of sample.

In the practice of the invention, the treating solution can be prepared by mixing the polyelectrolyte and the surfactant in water to produce an aqueous mixture having about 2–25% by weight solids, based on the total weight of polyelectrolyte surfactant. Higher or lower concentrations also can be utilized. Preferably, there can be employed 1 to 10 parts of surfactant, per part of polyelectrolyte to achieve effective results.

The aggregate can be fed into the treating solution in a variety of ways, as shown by Banino, U.S. Pat. No. 4,256,501, assigned to the same assignee as the present invention. For example, there can be used an inclined spiral screw assembly extending into a well, where the aggregate is fed into the well having treating solution and the spiral screw is thereafter rotated up an incline to a discharge point. The aggregate can then be allowed to dry under atmospheric conditions. The total treating time can vary from 15 to 90 seconds.

Other variations involve a slightly inclined screen deck and a vibrator to allow for the forward movement of aggregate under a spray bar dispensing treating solution or a bucket elevator arrangement involving the passage of buckets through an aggregate bed immersed in the treating solution. In particular instances, forced air can be used to effect the drying the treated aggregate.

In order that those skilled in the art will be better able to practice the invention, the following examples are given by way of illustration and not by way of limitation. All parts are by weight.

EXAMPLE 1

Aggregate having an average diameter of ⅜ inches was initially washed in tap water and thereafter dried at 100° C. The aggregate was obtained by crushing graywacke to subgraywacke rock, consisting of generally fine to medium size grains of quartz and a dark-gray to greenish-gray, somewhat argillaceous matrix having local inclusions of dark-gray to green shaly seams and pebble size fragments.

The aggregate was allowed to cool and then soaked in an aqueous surfactant mixture consisting of 10% by weight of polyethyleneamine (E-100) and a 0.01%, 0.1%, or 1% by weight of surfactant which included cationic surfactant, anionic surfactant and nonionic surfactant. The aggregate was allowed to soak in the (E-100) surfactant mixture for about 5 minutes. The treated aggregate was then filtered by pouring the aggregate treating mixture through a wire mesh screen. The aggregate was then dried at 100° C.

After drying, the aggregate was heated to 150° C. and it was completely covered with AC-10, a commercially availble asphalt cement which had been preheated to about 150° C. Coating of the aggregate was facilitated by stirring the aggregate-asphalt cement mixture for 3–5 minutes. The mixture was then allowed to cool to room temperature.

The same procedure was repeated, except that the aggregate was initially treated with the aqueous E-100 solution free of the surfactant. The asphalt coated aggregate was then subjected to the boiling water test to determine the degree of stripping which occurred. A control was also run where untreated aggregate was coated with asphalt cement.

The following results were obtained, where "% concentration" shows the concentration of surfactant in the aqueous aggregate polyelectrolyte-surfactant treating mixture, which was effective to reduce asphalt stripping to 10% or less. In instances where no % concentration is shown, stripping exceeded 10% at 0.01, 0.1 and 1% surfactant concentration. The expression "% stripping" indicates the degree of stripping of the asphalt from the surface of the aggregate which was less than 10%, and "control" means aggregate coated with asphalt without prior treatment with either polyelectrolyte or surfactant and the expression "no surfactant" means that the aqueous treating solution contained polyelectrolyte and was free of surfactant. In instances where no value is shown for % stripping, the % stripping was greater than 10%:

Cationic Surfactants

| Surfactant | % Concentration | % Stripping |
|---|---|---|
| Control No surfactant | 0 | <2% |
| Kemamine T-9702D, Lot T9114-11 | | |
| Alkaterge E | 1.0 | <5 |
| Kemamine P650D, Lot P-746 | | |
| Kemamine P790, Lot T6001-2 | | |
| Kemamine P880D, Lot P724 | | |
| Kemamine P690, Lot T7G15-3 | | |
| Alkaterge T Lot 1077 | 1.0 | 5–10 |
| Fluorad FC-134, | | |
| Fluorad FC-134, Lot T9F05-19 | | |
| Fluorad FC-430 | | |
| Adogen 442, Lot 9179-M644-140 | | |
| Amine 100 | 0.1 | ≦5 |
| Amine 160 | 1.0 | <10 |
| Adogen 441 | 1.0 | <5 |
| Adogen 464 | 1.0 | <5 |
| Variquat B345 7220-K | 1.0 | <5 |
| Variquat K-300 (Dicoco Me₂) | 1.0 | 5–10 |
| Emcol CC-35 | | |
| Emcol CC-36 | | |
| Emcol CC-42, R1810 | | |
| Duomeen C (N Coco 1,3 Diaminopropane) | | |
| Duomeen T (N Tallow 1,3 Diaminopropane) | | |
| Armeen C (CoCoamine) | | |
| Armeen 12-D (Dodecylamine) | | |
| Armene-T (Tallowamine,) | | |
| Dodecyltri-methylammonium-chloride | 1.0 | ≧5 |
| Amine-O | | |
| Amine-O Dodecylamine (laurylamine, D22,220-8) | | |

Anionic Surfactants

| Surfactant | % Concentration | % Stripping |
|---|---|---|
| Hamposyl C (Cocyl Sarcosin) | | |
| Hamposyl C-30 (Sodiumcocyl Sarcosinate) | | |
| Hamposyl M30 (Sodium Myristoyl Sarcosinate) | | |
| Hamposyl S (Stearoyl Sarcosine) | 0.1 | ≦10 |
| Hamposyl-O | 1.0, 0.1, 0.01 | 10 |
| Hamposyl-M | | |
| Gafac-RM410 | 1.0 | ≦10 |
| Gafac RS410 | 1.0 | ≦2 |
| Gafac LO-529 | 1.0, 0.1 | ≦5 |
| Duponol G | | |
| Zelec NE | 0.1 | 2–10 |
| Avitone-F | 1.0 | 10 |
| Duponol-D | 0.01 | 10 |
| Alkanol-XC | | |
| Colloid 119/50 | | |
| Sarkosyl-O | 0.01 | 5 |
| Aerosol-OT-100 | 1.0 | 5 |
| Klearfac AA-420 | 0.01 | 5 |
| Aerosol OT-S | | |
| Dowfax 2A1 (solution) | | |
| Klearfac AA-270 | 0.01 | ≦1 |
| Gafac RE-610 | | |
| Witconite P10-20P | 1.0 | 5 |
| Witconite P10-59 | 1.0 | 5 |
| Tamol | | |
| Emphos CS-341 | 0.1 | <5 |
| Emphos CS-1361 | 0.1 | ≦5 |
| Emphos CS-3304 | 1.0 | 5–10 |
| Emphos CS-330 | 1.0 | ≦5 |
| Triton GR-7M | 0.01 | 5–10 |
| Ninate 401-U | | |
| Ninate 411 | 0.1 | ≧10 |
| Richonic Acid B | 1.0 | ≧10 |
| Richonate YLA | 1.0 | 5–10 |
| Richonic Acid T-2H | 0.01 | 5–10 |
| Fluorad FC-98 | | |
| Fluorad FC-143 | 1.0 | 10 |
| Fluorad (Etching Bath Additive) FC | 0.1 | ≦10 |
| Atlas G-3300 | 0.01 | ≧10 |
| Kelco (Superloid Ammonium Alginate) | | |

Nonionic Surfactants

| Surfactant | % Concentration | % Stripping |
|---|---|---|
| Pluronic L61 | 0.01 | 10 |
| Pluronic RA-20 | 1.0, 0.1, 0.01 | 10 |
| Tetronic 1504 (Polyol) | 1.0 | ≧10 |
| Tetronic 904 | 0.01 | 5 |
| Plurafac RA-30 | 0.1 | ≦5 |
| Plurafac A-24 | 1.0 | <5 |
| Pluronic F-77 | 0.1 | 5–10 |
| Pluronic 10R8 | 0.1 | 5 |
| Pluronic 17R1 | 0.1 | <5 |
| Pluronic 25R8 | 0.01 | 10 |
| Pluronic 25R4 | | |
| Pluronic 17R4 | | |
| Pluronic 31R4 | 0.1 | 5–10 |
| Varonic 1800MS | | |
| Span 85 | 1.0, 0.1 | 5 |
| Merpol SH | 1.0, 0.1 | <5 |
| Merpol OJ | | |
| Zonyl FSN (flurosurfactant) | | |
| Pluronic 25R5 (fluorosurfactant) | 1.0, 0.1, 0.01 | 10 |
| Pluronic 10R5 | 0.1 | 5–10 |
| Antarox BL-225 (Aliphatic polyester) | 0.01 | 5 |
| Igepal CA-420 (Polyethylene derivative) | 1.0 | 5–10 |
| Igepal CO-210 | 1.0 | 5 |
| Igepal CA-420 | 1.0 | >10 |
| Igepal OD-410 | | |
| Span 80 | 1.0 | <5 |
| Brij 35 | 1.0 | 5 |
| Renex 30 | 1.0, 0.1, 0.01 | <5 |
| Tween 80 (Polysorbate 80 USP) | 1.0 | <10 |
| Span 60 (Sorbitan monostearate) | 0.1 | >10 |
| Atmos 150 (Mono-diglicerides) | 1.0 | 5–10 |
| Sterox ND | 1.0 | 5–10 |
| Poly-Tergent B-150 | 1.0, 0.1, 0.01 | 10 |

-continued

| Nonionic Surfactants | | |
|---|---|---|
| Surfactant | % Concentration | % Stripping |
| Makon 4 | 1.0 | <5 |
| Flo-Mo AJ-85 | 1.0 | <2 |
| Poly-Tergent 52 | 1.0 | <5 |
| Poly-Tergent B-300 | 1.0 | <5 |
| Pomulgen 13229-G | 1.0 | <5 |
| Triton X45-6-1571 | 1.0 | >10 |
| Triton X15 6-5721 | 1.0, 0.1, 0.01 | 10 |
| Triton X-207 6-1502 | 1.0 | <5 |
| Triton X-35 | 1.0 | <2 |
| Triton X-305 | 1.0, 0.1, 0.01 | <5 |
| Fluorad FC-170 | 1.0 | <5 |
| Fluorad FC-432 | 1.0 | <2 |
| Makon-6 | 0.1 | <5 |
| Witcamide 5133 | 1.0 | <5 |
| Igepal DM-530 | 1.0, 0.1, 0.01 | <10 |
| Actramide 202 | 1.0 | <2 |
| Tergitol 25-L-7 | 1.0, 0.1, 0.01 | 10 |
| Tergitol 25-L-12 | 1.0, 0.1 | <2 |
| Witcamide 511 C-880 | 1.0 | <2 |
| Monamine T-100 | 10 | <2 |
| Monamide 150-ADY (Lot 7790) | 1.0 | <2 |
| Monamine CD-100 (Lot 7790) | 1.0 | <2 |

The above results show that generally, anionic and nonionic surfactants are superior as antistripping agents for asphalt coated aggregate than cationic surfactants.

EXAMPLE 2

In accordance with the procedure of Example 1, the same quartz aggregate as in Example 1 was treated with a 10% aqueous solution of E-100, which is a polyethylenepolyamine having a molecular weight of about 250-300, and a specific gravity at 25° C. of 1.02. The same aggregate also was treated with an aqueous mixture of 10% E-100 and 0.01% by weight of Klearfac. In both instances, the aggregate was immersed in the treating solution for 5 minutes and thereafter removed from the aqueous treating solution by filtration onto a wire mesh screen and allowed to dry under atmospheric conditions.

The above treated aggregate was then evaluated for its ability to resist weathering in accordance with the 10 cycle magnesium sulfate rock soundness test in accordance with New York State Department Transportation test method New York 207 B-76 as previously described. The following results were obtained, where control means that untreated aggregate was used and additional treating mixtures of E-100 and surfactants were evaluated. The following results were obtained, where %Loss is based on the original weight of the aggregate sample in accordance with the 10 cycle magnesium sulfate rock soundness test as previously described:

TABLE II

| Treating Solution | Conc. | % Loss |
|---|---|---|
| Control | | 80.6 |
| E-100 | 10% | 27.6 |
| E-100 + Klearfac | 10% 0.01% | 18.4 |
| E-100 + Klearfac | 10% 0.1% | 30.6 |
| E-100 + Alkaterge | 10% 1% | 8.6 |
| E-100 Fluxed FC-432 | 10% | 18.7 |

The above results show that the surfactant does not substantially change the weatherability performance imparted to the aggregate as a reslt of treatment with the polyethylenepolyamine electrolyte. As a result, those skilled in the art would know that aggregate treated in accordance with the practice of the invention, that is with a treating solution containing both a polyelectrolyte and a surfactant would exhibit improved resistance to the effects of environmental degradation as well as imparting improved reinforcement and performance characteristics to asphalt concrete, based on the use of such treated aggregate.

EXAMPLE 3

The procedure of Example 1 was repeated with sandstone aggregate which was treated with a 10% aqueous solution of the E-100 polyethylenepolyamine and various concentrations of different surfactants and the resulting treated aggregate was then coated with asphalt and subjected to the boiling water test. The following results were obtained:

TABLE III

| Surfactant | % | % Stripping | Type |
|---|---|---|---|
| Garfac RS-410 | 1 | <2 | Anionic |
| Klearfac AA-270 | .01 | <1 | Anionic |
| Flo-Mo | 1 | <2 | Nonionic |
| Poly-Terge B-300 | 1 | <2 | Nonionic |
| Flor-Rad FC-432 | 1 | <2 | Nonionic |
| Monamine T-100 | 1 | <2 | Nonionic |
| Tergitol 25-1-12 | .1 | <2 | Nonionic |
| Alkaterge #-78 | 1 | <5 | Cationic |
| Amine 100-76 | .1 | <5 | Cationic |

The above results show that a significant reduction in weight percent stripping can be achieved when the boiling water test is used to determine resistance to stripping of aggregate treated in accordance with the practice of the present invention.

Although the above examples are directed to only a few of the very many variables which can be utilized in the practice of the present invention, it should be understood that the present invention is directed to a much broader variety of aggregate and the treatment of such aggregate with various polyelectrolytes such as polyalkylenepolyamine, and polyethyleneimine as well as surfactants shown in the discussion prior to the above examples.

What I claim as new and desire to secure by Letters Patent of the United States is:

1. A method for enhancing the resistance of aggregate to the effects of atmospheric degradation and improve its ability to resist separation from cured asphalt concrete when incorporated into asphalt cement prior to cure to reinforce the resulting asphalt concrete mixture which comprises,
   (1) treating the aggregate with an aqueous polyelectrolyte-surfactant mixture having at least 1% by weight of polyelectrolyte with a molecular weight of up to about 1000 and 0.001% to 1% by weight of surfactant, based on the weight of the mixture, where the surfactant is selected from the class consisting of a cationic surfactant, an anionic surfactant, a nonionic surfactant, and an amphoteric surfactant,
   (2) and thereafter allowing the treated aggregate to dry by heating or exposure to ambient conditions.

2. A method in accordance with claim 1, where the polyelectrolyte is a polyalkylenepolyamine.

3. A method in accordance with claim 1, where the polyelectrolyte is a polyethyleneimine.

4. A method in accordance with claim 1, where the surfactant is a cationic surfactant.

5. A method in accordance with claim 1, where the surfactant is an anionic surfactant.

6. A method in accordance with claim 1, where the surfactant is a nonionic surfactant.

7. A method in accordance with claim 1, where the surfactant is an amphoteric surfactant.

8. Aggregate treated with an aqueous polyelectrolyte-surfactant mixture having at least 1% by weight of polyelectrolyte with a molecular weight of up to about 1000.

9. Aggregate in accordance with claim 8, where the aggregate is sandstone aggregate.

10. Aggregate in accordance with claim 8, where the aggregate is limestone aggregate.

11. Aggregate in accordance with claim 8, where the aggregate is marble aggregate.

12. Asphalt concrete composition comprising sand, asphalt cement and up to 90% by weight of aggregate treated with a mixture of polyelectrolyte and surfactant.

* * * * *